(12) United States Patent
Huang et al.

(10) Patent No.: US 8,558,906 B2
(45) Date of Patent: Oct. 15, 2013

(54) IMAGE CAPTURING DEVICE HAVING ELECTROMAGNETIC WAVE SIGNAL TRANSMITTING AND RECEIVING FUNCTIONS

(75) Inventors: Wei-Chun Huang, Taipei (TW); Tsung-Hsing Hsieh, Taipei (TW)

(73) Assignee: Prodigid Limited, Kowloon (HK)

( * ) Notice: Subject to any disclaimer, the term of this patent is extended or adjusted under 35 U.S.C. 154(b) by 248 days.

(21) Appl. No.: 13/109,026

(22) Filed: May 17, 2011

(65) Prior Publication Data

US 2012/0293668 A1    Nov. 22, 2012

(51) Int. Cl.
*H04N 5/232* (2006.01)

(52) U.S. Cl.
USPC ............... 348/211.99; 348/211.1; 348/211.2; 348/211.3; 348/211.4

(58) Field of Classification Search
USPC ............ 348/211.99, 211.1–211.4; 396/56–59
See application file for complete search history.

(56) References Cited

U.S. PATENT DOCUMENTS

2007/0098384 A1* 5/2007 Wakamizu et al. ............. 396/56
2011/0040757 A1* 2/2011 Kossi et al. .................... 707/737

* cited by examiner

*Primary Examiner* — Yogesh Aggarwal
(74) *Attorney, Agent, or Firm* — Chun-Ming Shih; HDLS IPR Services

(57) ABSTRACT

An image capturing device having electromagnetic wave signal transmitting and receiving functions is disclosed. The image capturing device has a circuit board, a lens module and a wireless radio frequency unit. The circuit board is electrically connected to the main board. The lens module has a housing. The housing has a barrel body and an antenna arranged inside the barrel body. The antenna is electrically connected to the circuit board. The wireless radio frequency unit is electrically connected to the circuit board. Since the antenna is arranged inside the lens module.

11 Claims, 3 Drawing Sheets

IMAGE CAPTURING DEVICE HAVING ELECTROMAGNETIC WAVE SIGNAL TRANSMITTING AND RECEIVING FUNCTIONS

BACKGROUND OF THE INVENTION

1. Field of the Invention

The present invention relates to a lens, in particularly to an image capturing apparatus, which is capable of receiving and emitting electromagnetic wave signals.

2. Description of Related Art

As the technology keeps improving, the trend of electronics device such as personal computers, personal digital assistant (PDA) and mobile phone is towards lightweight and compact. That increases the portable convenience for users.

The modern electronic devices having several functional modules built therein. For instance, the camera module in the electronic device can capture images around the user. After the images are captured, they can be transferred by the electronic devices through various kinds of communication network and then shared with people. That has become a popular social networking for friends and relatives to share their recently activities.

For transmitting the images captured by the lens module, an antenna is needed to build in the portable electronic device to transfer or receive files of the images. Larger-sized antennas usually have better performance on transmitting and receiving. However, they occupy more space in the electronic devices or are too large to arrange inside the electronic device. In contrary, the small-sized antenna can not provide equivalent performance on transmitting and receiving.

SUMMARY OF THE INVENTION

Therefore, the main objective of the present invention is to solve the above-mentioned problem, arranging the antenna inside the lens module to provide the transmitting and receiving functions and to downsize the electronic device.

For achieving the above objective, the present invention provides an image capturing device having electromagnetic wave signal transmitting and receiving functions, for arranging inside an electronic device and electrically connected to a main board of the electronic device. The image capturing device has a circuit board, a lens module and a wireless radio frequency unit. The circuit board is electrically connected to the main board. The lens module has a housing. The housing has a barrel body and an antenna arranged inside the barrel body. The antenna is electrically connected to the circuit board. The wireless radio frequency unit is electrically connected to the circuit board.

DETAILED DESCRIPTION OF THE INVENTION

A detailed description of the present invention will be made with reference to the accompanying drawings.

Figure 1:
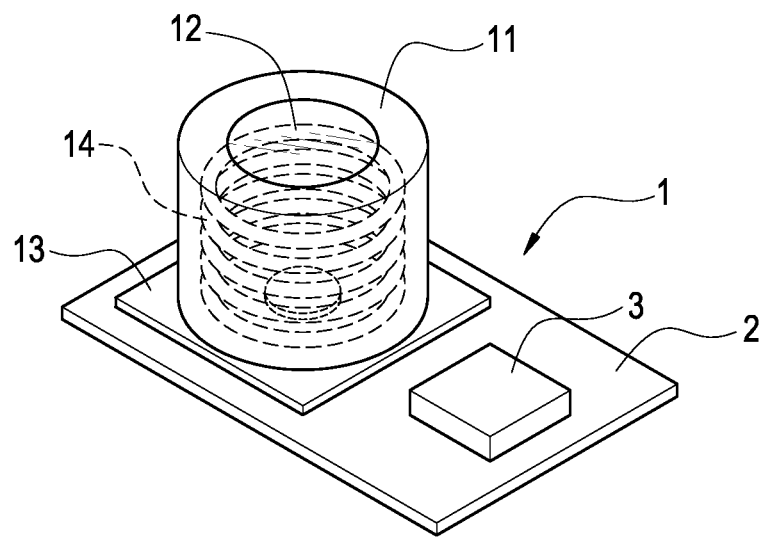
FIG. 1 is a schematic view of an image capturing device of the present invention.
Figure 2:
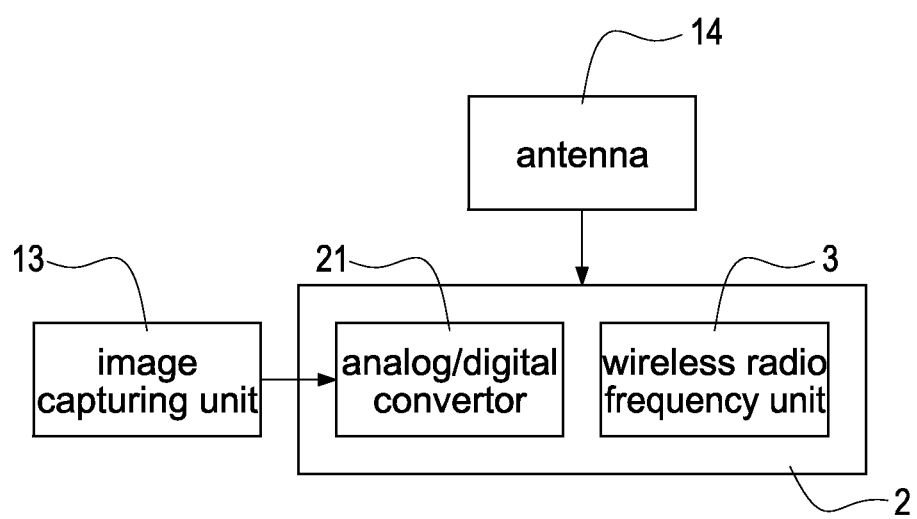
FIG. 2 is a block diagram of the image capturing device of the present invention.

FIG. 1 and FIG. 2 show an image capturing device according to an embodiment of the present invention. The image capturing device has electromagnetic wave signal transmitting and receiving functions. The image capturing device has a lens module 1, a circuit board 2 and a wireless radio frequency unit 3.

Figure 3:
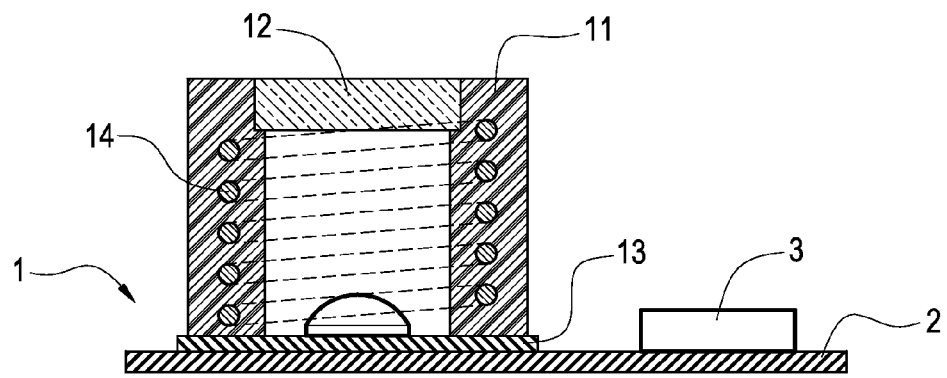
FIG. 3 is a sectional view of the image capturing device of the present invention.
Figure 4:
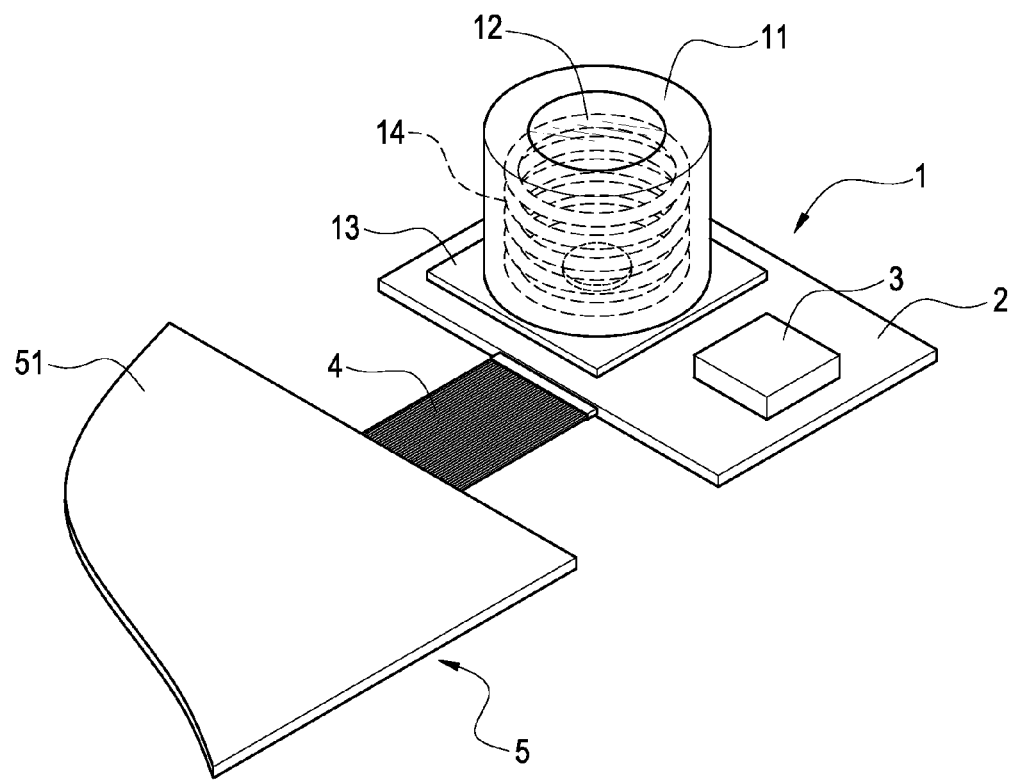
FIG. 4 is a schematic view of the image capturing device of the present invention.

The lens module 1 has a housing 11. An optical lens 12 is arranged at a front end of the housing 11 for receiving exterior image light. An image capturing unit 13 is arranged at a rear end of the housing 11 for receiving the image light passing from the optical lens 12. The image capturing unit 13 can be a complementary metal oxide semiconductor sensor or a charge coupled device. In another aspect, the housing 11 has a barrel body 111 (as FIG. 3 shows) and an antenna 14 arranged inside the barrel body 111. The antenna 14 is inserted into the cavity of mold before the material to form the barrel body 111 is injected into the cavity. After the injection, the antenna 14 is embedded inside the barrel body 111. In this embodiment, the antenna 14 is of spiral shaped, planar shaped, rod shaped and circular shaped. The image capturing unit 13 is electrically connected to the circuit board 2. The antenna 14 is also electrically connected to the circuit board 2.

The circuit board 2 is electrically connected with the image capturing unit 13 of the lens module 1 and the antenna 14. An analog/digital converter 21 is arranged on the circuit board 2 and electrically connected to the image capturing unit 13. The analog/digital converter 21 can receive the analog signal outputted from the image capturing unit 13 and convert the analog signal into digital signal for further processing by the main board of the electronic device.

The wireless radio frequency unit 3 is electrically connected to the circuit board 2. The wireless radio frequency unit 3 can transmit and receive signals through the antenna 14. The wireless radio frequency unit 3 can be a reader/writer device, a RFID reader/writer device, or apply near field communication technology. The wireless radio frequency unit 3 also can be a Wi-Fi module, or a Bluetooth module.

As FIG. 2 and FIG. 3 show, while operating the image capturing device, the exterior images can pass through the optical lens 12 and be received by the image capturing unit 13. Then, the analog/digital converter 21 on the circuit board 2 can transform the analog signals to digital signals, and transmit the digital signals through the flat cable 4 and to the main board 51 of the electronic device 5 for further processing and displaying.

After signals are received by the antenna 14 inside the housing 11, the signals will be processed by the wireless radio frequency unit 3 and transmitted through the circuit board 2 and the flat cable 4 to the main board 51 of the electronic device 5.

When transmitting signals, the signals can be transferred by the main board 51 of the electronic device 5 through the flat cable 4 and to the circuit board 2. And then the wireless radio frequency unit 3 on the circuit board 2 will transmit the signals through the antenna 14.

Figure 5:
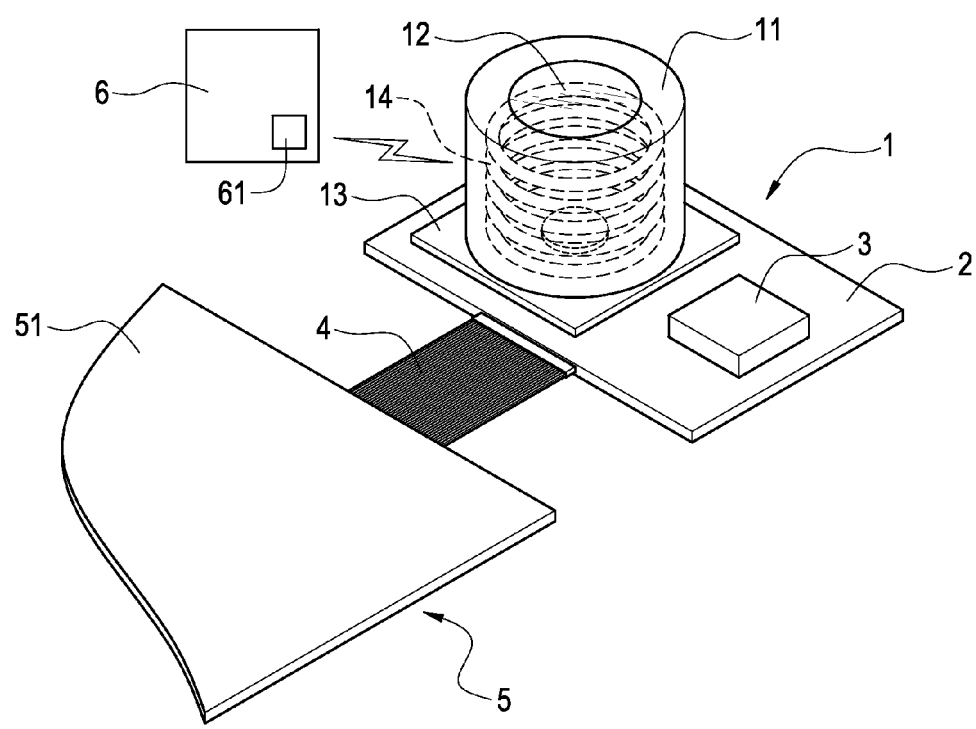
FIG. 5 is another schematic view of the image capturing device of the present invention.

As FIG. 5 shows, the wireless radio frequency unit 3 can be operated at the frequency of 13.56 MHz. In case that the wireless radio frequency unit 3 is a RFID reader/writer device, which is able to read information stored in the RFID tag 61 attached on the object 6 and write information into the RFID tag 61.

Figure 6:
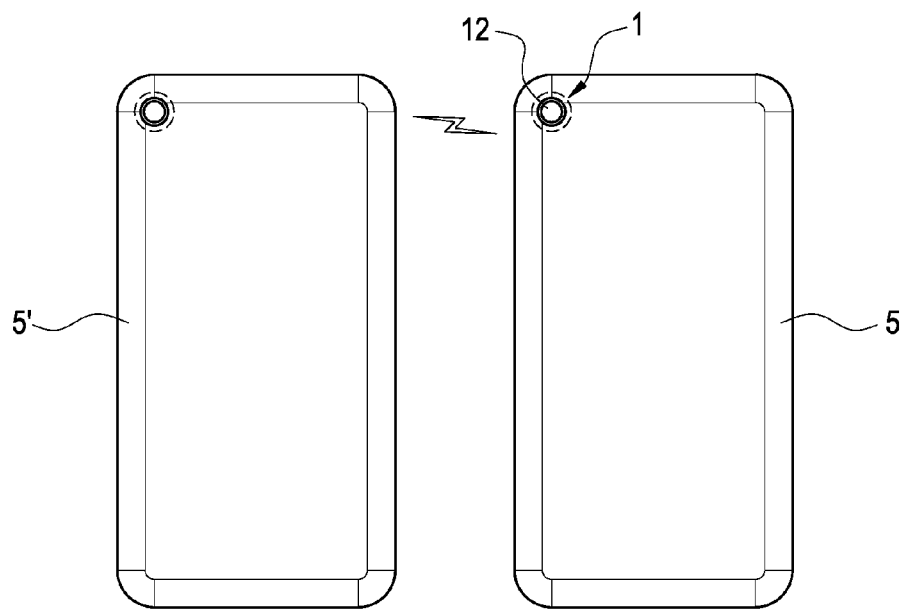
FIG. 6 is a schematic view illustrating the image capturing device arranged on the electronic device.

As FIG. 6 shows, when two electronic devices 5 are approaching each other, information can be transmitted between the two electronic devices 5 through the antenna 14 inside the housing 11.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An image capturing device having electromagnetic wave signal transmitting and receiving functions, to be arranged inside an electronic device and electrically connected to a main board of the electronic device, the image capturing device comprising:
   a circuit board electrically connected to the main board;
   an image capturing unit disposed on and electrically connected to the circuit board;
   a lens module having a housing disposed on the image capturing unit, the housing having a hollow cylindrical barrel body and an antenna sourroundingly arranged inside the hollow cylindrical barrel body, wherein the antenna is formed by inserting into a cavity of mold before material to form the barrel body is injected into the cavity so that after injection, the antenna is embedded inside the barrel body and electrically connected to the circuit board; and
   a wireless radio frequency unit electrically connected to the circuit board.

2. The image capturing device as claim 1, further comprising an optical lens arranged at a front end of the housing.

3. The image capturing device as claim 2, further comprising an analog/digital converter arranged on the circuit board and electrically connected to the image capturing unit.

4. The image capturing device as claim 3, wherein the image capturing unit is a complementary metal oxide semiconductor sensor.

5. The image capturing device as claim 3, wherein the image capturing unit is a charge coupled device.

6. The image capturing device as claim 3, wherein the antenna is of spiral shaped, planar shaped, rod shaped or circular shaped.

7. The image capturing device as claim 6, wherein the wireless radio frequency unit is a reader/writer device.

8. The image capturing device as claim 7, wherein the reader/writer device is a RFID reader/writer device.

9. The image capturing device as claim 6, wherein the wireless radio frequency unit applies near field communication technology.

10. The image capturing device as claim 6, the wireless radio frequency unit is a Wi-Fi module.

11. The image capturing device as claim 6, the wireless radio frequency unit is a Bluetooth module.

* * * * *